July 9, 1963 R. W. COOLBAUGH 3,096,759
EMERGENCY SURVIVAL PACK
Filed June 18, 1962 5 Sheets-Sheet 1

INVENTOR.
RICHARD W COOLBAUGH

BY
ATTORNEY

*INVENTOR.*
RICHARD W COOLBAUGH
BY
ATTORNEY

July 9, 1963 R. W. COOLBAUGH 3,096,759
EMERGENCY SURVIVAL PACK
Filed June 18, 1962 5 Sheets-Sheet 4

INVENTOR.
RICHARD W. COOLBAUGH
BY
ATTORNEY

July 9, 1963 R. W. COOLBAUGH 3,096,759
EMERGENCY SURVIVAL PACK
Filed June 18, 1962 5 Sheets-Sheet 5

INVENTOR.
RICHARD W. COOLBAUGH
BY
ATTORNEY

_United States Patent Office_

3,096,759
Patented July 9, 1963

3,096,759
EMERGENCY SURVIVAL PACK
Richard W. Coolbaugh, 116 Glen Ridge Road,
East Aurora, N.Y.
Filed June 18, 1962, Ser. No. 203,248
6 Claims. (Cl. 128—94)

This invention relates to an emergency survival kit for emergency use at the scene of accidents involving personal injury and shock.

More particularly the invention relates to a low cost effective wrapper for application to an injured person in prone or erect posture, and which may be employed immediately at the scene of the accident as a blanket or wrapper for protecting the individual from exposure and to reduce the incidence of shock. The wrapper may also be employed as a cushion, heat insulator from ground cold, the wrapper being such as to afford ready access to most of the usual regions of injury occurring to a victim of accident. The wrapper in addition may provide support in the form of a sling for a broken arm, and provide pocket like receptacles for the personal effects of the injured as well as instructions for applying first aid in connection with the application of the wrapper to an accident victim.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
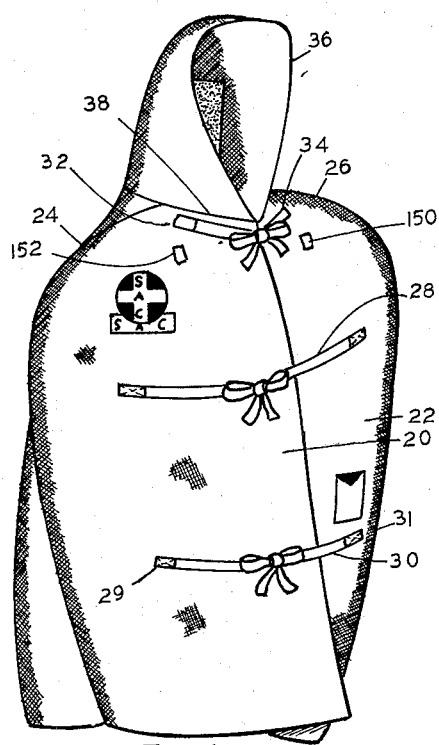
FIGURE 1 is a front elevational view of the wrapper, in the approximate shape assumed when applied to a victim.
Figure 2:
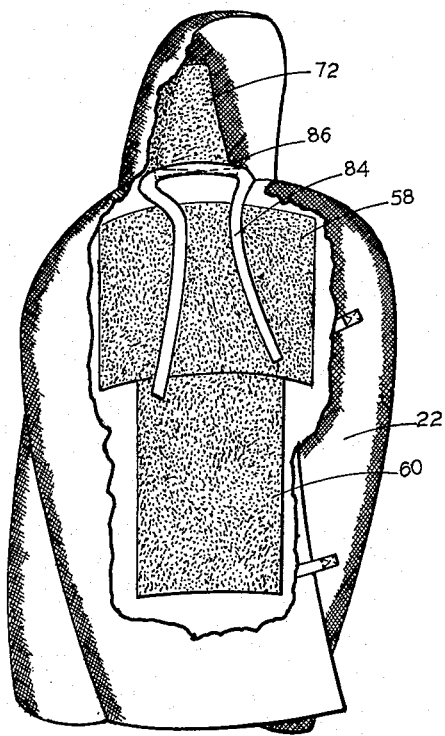
FIGURE 2 is a front elevational view of the wrapper, with parts broken away to show the location of various coacting elements.

Referring generally to FIGURE 1 there is shown a wrapper having overlapping front panels 20 and 22, the panels being joined to a rear panel around the shoulders as at 24 and 26. The front panels are provided with body ties 28 and 30 which may have their ends heat sealed as at 29 and 31 to the front panel material and are located at about the chest and a little below the waist level. A tie 32 and 34 is also provided in the neck region. A portion of the upper edges of the front panels and the back panel are joined to the lower edge of the hood 36, along the lines 38 and 40.

Figure 4:
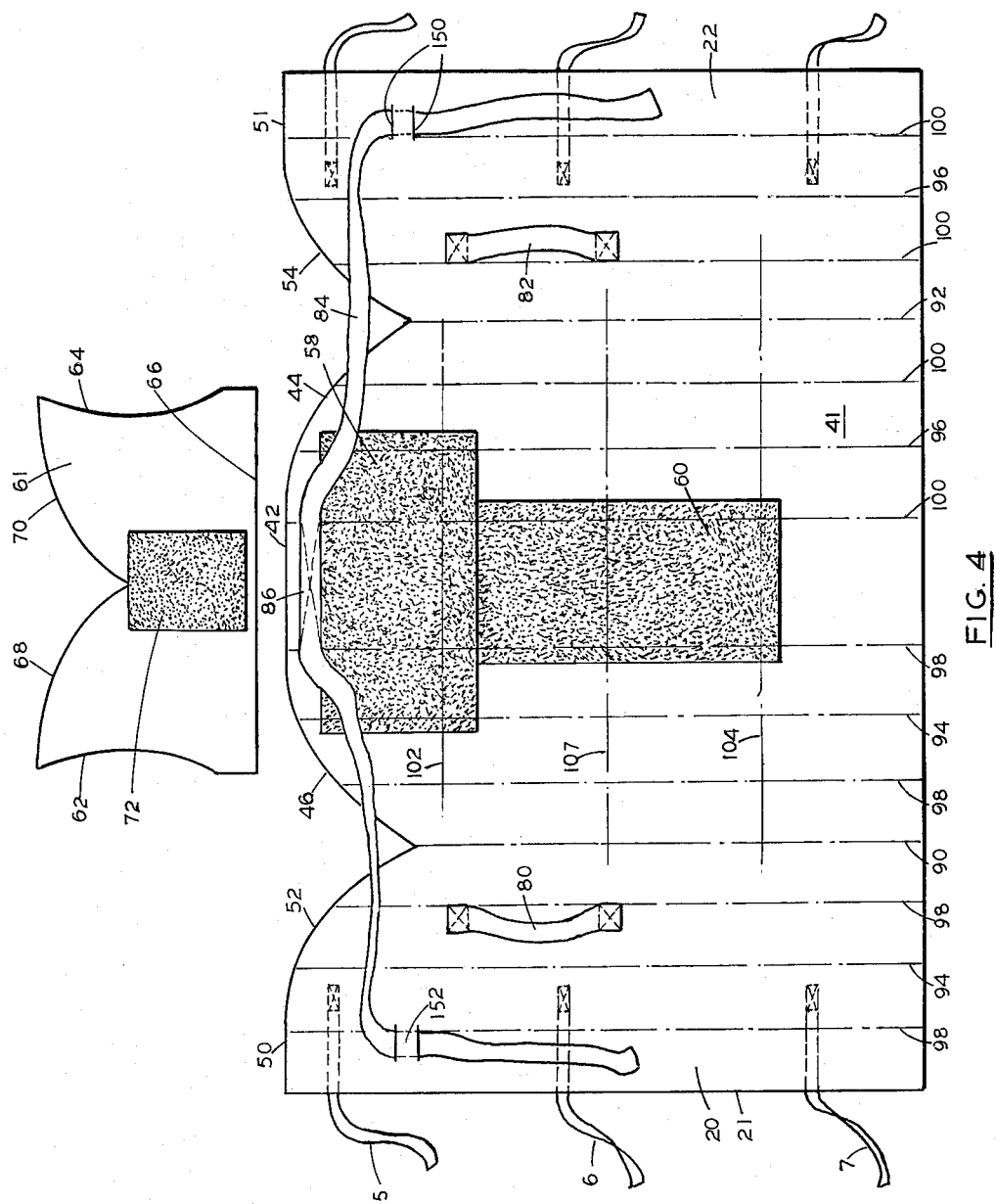
FIGURE 4 is a developed or exploded view of the parts prior to assembly.

Referring to FIGURE 4, the body portion of the wrapper may comprise a single sheet of material which is fire resistant, impervious to moisture and sanitary, and may be cut along the lines as indicated. The vertical back panel portion 41 is provided with a central upper straight edge 42, and curved side edges 44 and 46, and the front panel portions 20 and 22 have similar straight upper edge portions 50 and 51, and curved edges 52 and 54 respectively. The center section is provided with a polyurethane pad 58 of a generally rectangular shape, and of a width sufficient to span the shoulder of the average person, and a second pad 60 of like material, of about the same rectangular configuration, but disposed lengthwise is provided. In practice, the pads 58 and 60 are of about an eighth or three-sixteenths of an inch thick and are of a light material of a cellular nature such as polyurethane, providing a resilient compressibility, and exceptional resistance to heat transfer. Such material has an extremely low coefficient of thermal conductivity, approximately a third of that of glass wool, and is extremely light in weight and provides a soft cushion effect.

The hood portion 61 is formed of similar sheet material and may comprise a single piece, having a winglike configuration, the side edges 62 and 64 of which are curved inwardly, the lower edge 66 of which is relatively straight, and the upper edge of which is cusplike, the two curved edges 68 and 70 of which are adapted when joined to provide a hook for protection of a victim's head. A small pad of polyurethane of a thickness similar to pads 58 and 60 is provided within the hood to provide a head pad and cushion 72 and to likewise offer high resistance to heat transfer.

The sheet material of which the body portion and hood are formed may be material known as Kay-Cel, a plastisol saturated with a nylon scrim of 100 denier. Such material is waterproof, fire resistant, that is, will not support combustion, sanitary, light in weight and a heat insulator. It is capable of being bonded to the polyurethane pads by heat sealing.

It will be seen that the approximate length of the lower edge 66, of the hood member 61 corresponds to the combined lengths of the straight portions 42, 50 and 51 of the upper edges of the back and front panels 20, 22 and 41, so that upon overlapping the curved upper edges of the side panels 52 and 54 with the adjacent, curved edges 46 and 44 of the back panel, heat sealing to form the seams 24 and 26, the upper straight edges 42, 50 and 51 of the front and back panels may be heat sealed to the lower edge 66 of the hood section in a seam 38.

Suitable inside arm straps 80 and 82 may have their upper and lower ends heat sealed to the inside surface of the front panels 20 and 22, and a neck sling 84 of woven material may have its central section 86 heat sealed to the back panel, immediately above the cushion panel 58 and closely adjacent to the upper edge seam 38.

The wrapper structure formed by assembling the hood and back side panels in the manner described readily folds along lines extending lengthwise of the wrapper. In practice the hood is folded inwardly along the neck line as indicated by the seam 38 so as to overlie the shoulder pad 58 and the side and back panels are thereafter multiple folded, first along lines as generally indicated at 90, 92, in FIGURE 4 and FIGURE 6, while covering over the infolded hood.

Figure 6:
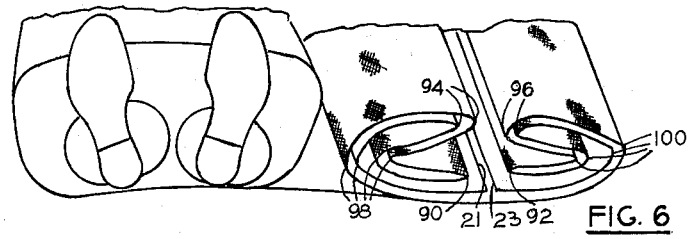
FIGURES 6-10 are fragmentary diagrammatic views of the wrapper, illustrating the longitudinal folds, and showing stages in application of the wrapper to a prone victim.

The side panels 20 and 22 and the underlying portions of the back panel are thereafter folded approximately along lines 94 and 96, the fold being a double thickness fold, and thereafter a third fold approximately along lines 98 and 100 is provided, the fold being a quadruple thickness fold. As shown in FIGURE 6 the side edges of the panels 20 and 22 are indicated at 21 and 23, and the various folds set forth are diagrammatically illustrated although it will be understood that the pack as folded in the manner described compresses neatly into a thin lengthwise assemblage. A fold of eigth thicknesses of the Kay-Cel material referred to amounting to a total thickness of about one sixteenth of an inch. The pack as thus folded, may thereafter have its upper fourth or quarter 101 folded over the central half 103, and the bottom fourth 105 folded up over the lower half of the central half 103, approximately on lines indicated at 102 and 104. Thereafter, the lower half is folded over the upper half as on the line 107, and the four quarters assume a substantially square pack. The wrapper pack as thus folded with the polyurethane pads is considerably less than an inch in thickness and may be inserted within a clear plastic pouch 106, which for the purposes may be transparent tubular polyethylene, heat sealed along one end as at 108. The package may contain an instruction card 110, which will be visible and readable through the wrapper envelope 106, and which may contain important instructions regarding use of the wrapper, and first aid generally, and may also set forth the contents.

Where colder climatic conditions are likely, there may be provided in the pack, a leg pouch 120 comprising a pair of like top and bottom panels 122 and 124, joined as by heat sealing with a side and end panel 126, the latter tapering to a narrow width as at 128, adjacent the open end 130 of the pouch. A draw string 132 is provided, looped through adjacent slits 134 in the top and bottom panels. Such a leg pouch may be folded and included in the pack, in the pouch 106.

Figure 3:
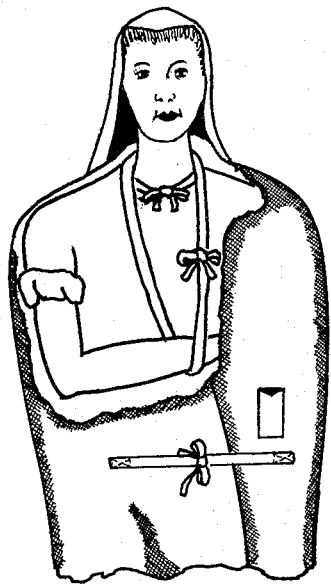
FIGURE 3 is a front elevational fragmentary view of the wrapper, with portions broken away to illustrate the application of an arm sling to an accident victim.
Figure 5:
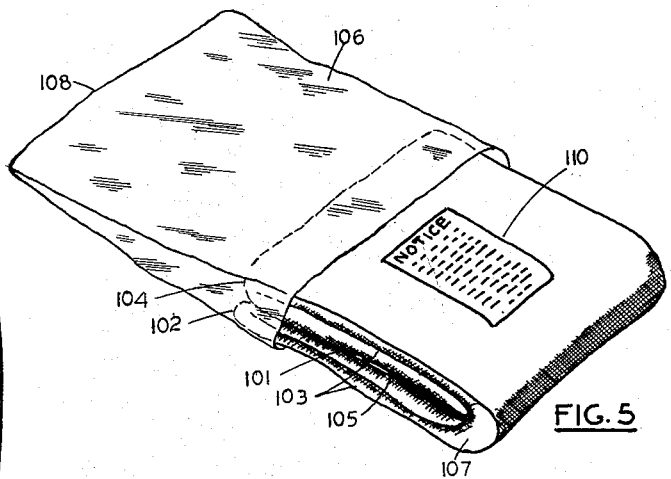
FIGURE 5 is a view of the kit with the contents partly removed from its envelope.

The application of the wrapper to a victim in standing position will be readily understood. The wrapper is removed from the pouch, unfolded and applied cape like, with the hood around the head, extending the arms through the loops 80 and 84, and overlapping the front panels 20 and 22, after which the ties are quickly completed with bow knots. The wrapper will be knee length or lower for the average wearer, and being open at the bottom, sufficient circulation is allowed to avoid condensation forming from sweating. If the victim requires a sling, and treatment for an arm injury, either front panel may be folded back, by releasing one or more ties, and the sling applied as shown in FIGURE 3. An identification card, and small personal belongings of the victim such as dentures, rings and the like may be placed in a suitable pocket or pockets such as 18 formed as a patch pocket, from the same material, the side edges and bottom being readily heat sealed to the panel portion.

Figure 7:
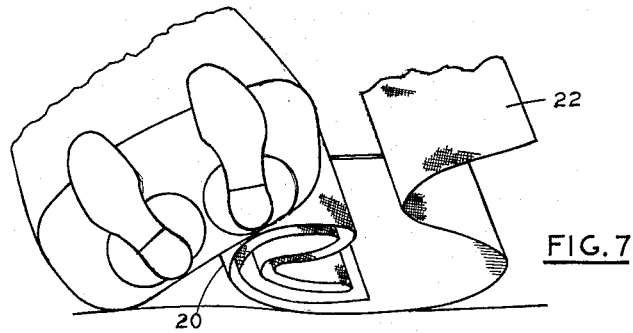
Figure 8:
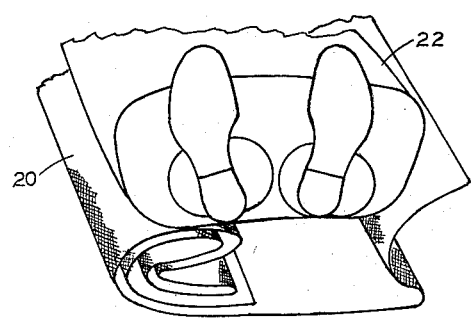
Figure 10:
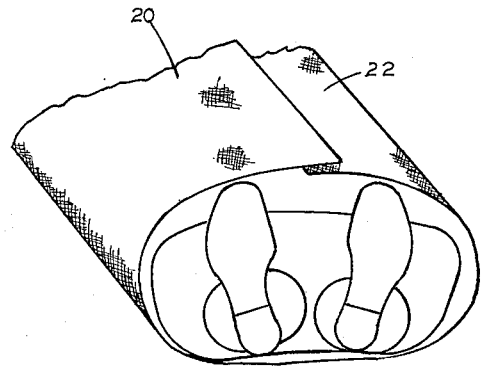
Figure 9:
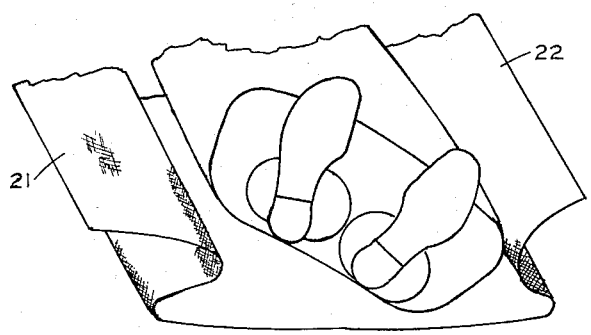
Figure 11:
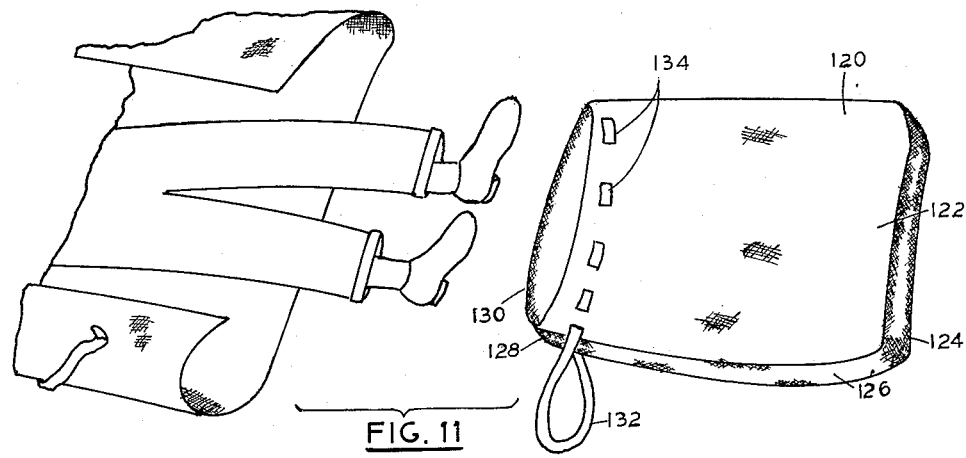
FIGURES 11, 12 and 13 are fragmentary diagrammatic views of the stages in applying the foot piece pouch to the victim.
Figure 12:
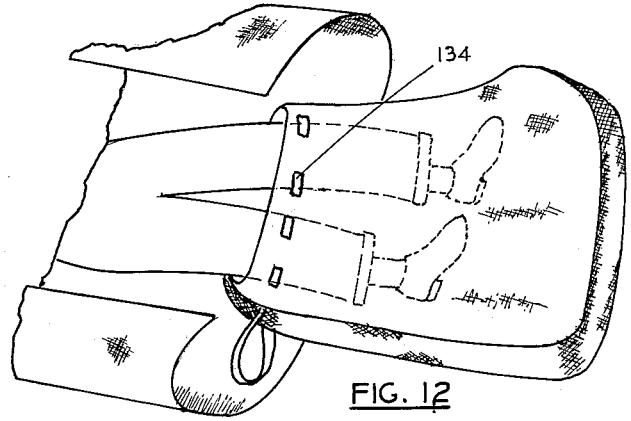
Figure 13:
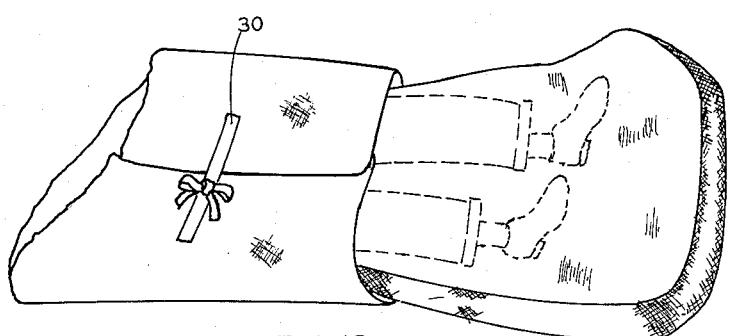

Assuming the victim is lying on the ground, as roughly indicated in FIGURE 6, the wrapper is unfolded lengthwise and laid along side of the victim as indicated. The victim may then be eased over folded panel 20, and panel 22 being previously opened as in FIGURE 7. Thereafter the victim may be rolled slightly away from panel 20, as in FIGURE 8, to permit the panel to be unfolded as in FIGURE 9; following which the panels are brought over the victim and overlapped, as shown in FIGURE 10. Prior to overlapping of the panels 20 and 22 as indicated in FIGURE 10, the foot piece pouch may be applied over the feet and lower limbs, as indicated in FIGURES 11 and 12, the draw string drawn sufficiently to contract the open end 130 as desired, it being understood that a sufficient opening should be left to permit air circulation to avoid condensate. Thereafter, the panels 20 and 22 are overlapped and the respective ties secured by bow and knots.

Figure 14:
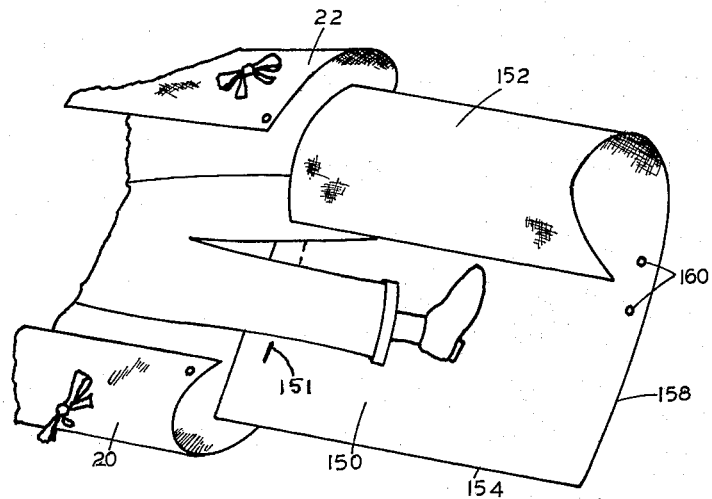
FIGURES 14, 15 and 16 illustrate an alternative leg wrapper or foot piece pouch, and its application to the victim.
Figure 15:
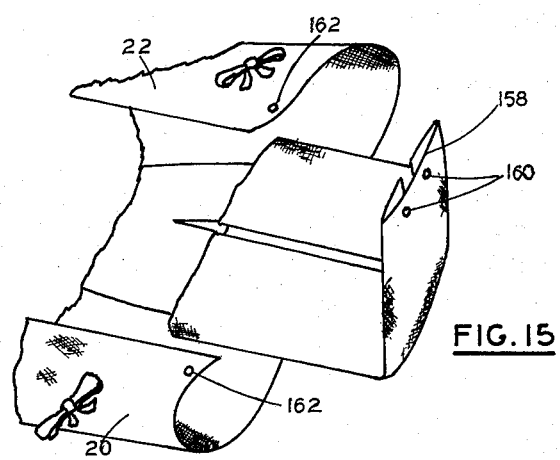
Figure 16:
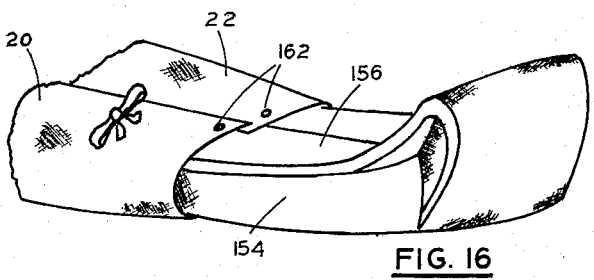

The leg pouch may if desired comprise a sheet of material like that employed for the wrapper, as indicated in FIGURES 14, 15 and 16, in which case the prone victim's legs are eased over the sheet 150, the side flanks 152 and 154 wrapped over each leg, the lower end portion 156 being then folded over as in FIGURES 15 and 16. The lower edge 158 may have several snaps 160 adapted to cooperate with snaps 162 on the front panels 20 and 22 of the body wrapper. It will be seen that the arrangement provides for treatment of an injury to one leg, by permitting the unwrapping of an injured leg, while the other leg remains protected.

From the foregoing it will be readily apparent that a protective wrapper is provided which is readily applied to a victim, whether able to sit up or stand, or flat on his or her back, either face up or down. The wrapper provides for ready access to the various body areas which may have been injured, without loss of the protection of the remainder of the wrap. The cushion pads provide comfort to a victim lying on hard ground, and acts as an effective thermal barrier against loss of body heat in cold severe weather, whereby pysiological shock, due to chill is prevented. The longitudinal folds of the pack permit the wrapper to be placed alongside a victim, and the front panels are readily pulled out after the victim has been rolled into position. The Kay-Cel being fire resistant and waterproof, and of high tensile strength, whether wet or dry, render the wrapper exceptionally useful as a protective covering where sparks or heavy rain is in the air. The wrapper material is of sufficient strength, such that it may be employed as an emergency lift as a lengthwise body sling, for transport, when no stretcher is available. The material has a dimpled waffle surface texture that affords good grip in the event such transport by assisting persons be required. The complete pack in its pouch may be stacked and under slight pressure; each pack will occupy a space of about one square foot, and a half inch thick, with a total weight of about one pound. Thus a large number of packs may be carried in ambulances or stored in locations where emergencies are likely to occur in a minimum of space.

The leg piece 150 of FIGURE 14, may if desired be heat sealed to the central lower edge portion of the wrapper as at 151, and the leg portion folded inwardly over the pads to form a second protective thickness, if not required for leg protection. Also for severe abdominal injuries, it may be folded back diaper fashion over the victim. If sheet material be required elsewhere, it can be removed by breaking the heat seal attachment.

The materials referred to readily heat seal to each other, as well as to cotton or other tapes, such as may be used for the sling 86. The seams referred to may be lapped seams, or the material may be inturned where a seam is desired and the inturned edge portions heat sealed. The wrapper material has sufficient strength such that edges need not be finished except as by cutting to shape, and slits such as 134, in FIGURE 11 require no binding for strength. The front panels of the wrapper may have a pair of slits such as 150 through which the ends of the sling as at 152 may be threaded so that on unwrapping of the folded panels, the sling straps will be kept clear of the victim. The entire construction will readily appear as one which lends itself to economical manufacture, whereby cost will not prevent the stocking of one or a quantity of the kits at strategic places, where emergencies are likely to occur.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A wrapper for emergency survival of accident victims, comprising a wrapper of thin sheet material having a body portion and a hood portion, said body portion having front panels, and a back panel approximately twice the width of each front panel, said front panels and back panels having, along their adjacent upper edges, curved shoulder portions forming a partial closure for the upper end, and a neck band portion, said hood portion being secured to the neck band portion, head, shoulder and body cushion pads of light weight relatively thin resilient heat insulating foam material, said head cushion being disposed centrally on the inside of said hood portion adjacent said neck band, said shoulder cushion being disposed on the inside of said back panel and extending transversely thereof shortly below said neck band and to a width greater than half the width of said back panel, and said body cushion extending over a central area of said back panel extending from said shoulder pad, and to a width less than a half of the width of said back panel.

2. A wrapper for emergency survival of accident victims, comprising a wrapper of thin sheet material having a body portion and a hood portion, said body portion having front panels, and a back panel approximately twice the width of each front panel, said front panels and back panels having, along their adjacent upper edges, curved shoulder portions forming a partial closure for the upper end, and a neck band portion, said hood portion being secured to the neck band portion, head, shoulder and body cushion pads of light weight relatively thin resilient heat insulating foam material, said head cushion being disposed centrally on the inside of said hood portion adjacent said neck band, said shoulder cushion being disposed on the inside of said back panel and extending transversely thereof shortly below said neck band and to a width greater than half the width of said back panel, and said body cushion extending over a central area of said back panel extending from said shoulder pad, and to a width less than a half of the width of said back panel, said cushions being heat sealed to the respective areas of said hood and back panel.

3. A wrapper for emergency survival of accident victims, comprising a wrapper of thin sheet waterproof fire resistant high strength material having a knee length body portion and a hood portion, said body portion having front panels, and a back panel approximately twice the width of each front panel, said front panels and back panels having, along their adjacent upper edges, curved shoulder portions forming a partial closure for the upper end, and a neck band portion, said hood portion being secured to the neck band portion, head, shoulder and body cushion pads of light weight relatively thin resilient foam polyurethane of low thermal conductivity, said head cushion being disposed centrally on the inside of said hood portion adjacent said neck band, said shoulder cushion being disposed on the inside of said back panel and extending transversely thereof shortly below said neck band to a width greater than half the width of said back panel and to a length approximately a quarter of the length of the back panels, and said body cushion extending over a central area of said back panel extending from said shoulder pad, and of a width less than a half of the width of said back panel, said cushions being heat sealed to the respective areas of said hood and back panel, and an arm sling having its central portion banded to the neck band portion of said back panel between said head and shoulder pads.

4. A wrapper for emergency survival of accident victims, comprising a wrapper of thin fire resistant waterproof high strength sheet material comprising a plastisol with a nylon scrim of 100 denier having a knee length body portion and a hook portion, said body portion having front panels, and a back panel approximately twice the width of each front panel, said front panels and back panels having, along their adjacent upper edges, curved shoulder portions forming a partial closure for the upper end, and a neck band portion, said hood portion being secured to the neck band portion, head, shoulder and body cushion pads of light weight relatively thin resilient heat insulating foam polyurethane, said head cushion being disposed centrally on the inside of said hood portion adjacent said neck band, said shoulder cushion being disposed on the inside of said back panel and extending transversely thereof shortly below said neck band to a width greater than half the width of said back panel, and said body cushion extending over a central area of said back panel extending from said shoulder pad, and of a width less than a half of the width of said back panel, said cushions being heat sealed to the respective areas of said hood and back panel.

5. A wrapper according to claim 4 wherein the front panels are provided exteriorly thereof with neck, chest and body tie straps having one end heat sealed to their respective panels.

6. An emergency survival pack for accident victims comprising a wrapper of thin sheet flexible material having a body portion and a hood portion, said body portion having front panels, and a back panel approximately twice the width of each front panel, said front panels and back panels having, along their adjacent upper edges, curved shoulder portions forming a partial closure for the upper end, and a neck band portion, said hood portion being secured to the neck band portion, head, shoulder and body cushion pads of light weight relatively thin resilient heat insulating foam material, said head cushion being disposed centrally on the inside of said hood portion adjacent said neck band, shoulder cushion being disposed on the inside of said back panel and extending transversely thereof shortly below said neck band to a width greater than half one width of said back panel, and said body cushion extending over a central area of said back panel extending from said shoulder pad, and of a width less than said shoulder pad, said cushions being bonded to the respective areas of said hood and back panel, said wrapper being folded lengthwise thereof in two quadruple folds, and said wrapper with its quadruple folds being folded crosswise to form a substantially square flat pack adapted for packaging in a transparent substantially square open sided envelope.

No references cited.